(12) United States Patent
Zhang et al.

(10) Patent No.: US 11,906,460 B2
(45) Date of Patent: Feb. 20, 2024

(54) ELECTRICAL CAPACITANCE VOLUME TOMOGRAPHY DEVICE FOR CRYOGENIC FLUID FLOWING IN VENTURI TUBE

(71) Applicant: ZHEJIANG UNIVERSITY, Zhejiang (CN)

(72) Inventors: Xiaobin Zhang, Hangzhou (CN); Tao Xia, Hangzhou (CN); Huangjun Xie, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 45 days.

(21) Appl. No.: 17/706,596

(22) Filed: Mar. 29, 2022

(65) Prior Publication Data

US 2022/0221417 A1    Jul. 14, 2022

Related U.S. Application Data

(63) Continuation of application No. PCT/CN2021/082080, filed on Mar. 22, 2021.

(30) Foreign Application Priority Data

Apr. 29, 2020   (CN) .......................... 202010357506.3

(51) Int. Cl.
| | | |
|---|---|---|
| *G01N 27/00* | (2006.01) | |
| *G01N 27/22* | (2006.01) | |

(52) U.S. Cl.
CPC ......... *G01N 27/226* (2013.01); *G01N 27/228* (2013.01)

(58) Field of Classification Search
USPC ................................................ 324/660–663
See application file for complete search history.

(56) References Cited

U.S. PATENT DOCUMENTS

| | | | | |
|---|---|---|---|---|
| 5,745,377 A | * | 4/1998 | Power ................... | G01F 23/268 |
| | | | | 73/304 C |
| 9,110,115 B2 | | 8/2015 | Marashdeh et al. | |

(Continued)

FOREIGN PATENT DOCUMENTS

| | | |
|---|---|---|
| CN | 1538168 A | 10/2004 |
| CN | 102495107 A | 6/2012 |

(Continued)

OTHER PUBLICATIONS

International Search Report (PCT/CN2021/082080); dated Jun. 23, 2021.

(Continued)

*Primary Examiner* — Vincent Q Nguyen
(74) *Attorney, Agent, or Firm* — W&G Law Group (57) ABSTRACT

Disclosed is an electrical capacitance volume tomography applied to flow monitoring in a Venturi tube of a cryogenic fluid (such as liquid nitrogen (~78K) and liquid oxygen (~90K)). The device includes a conductor rod, a metal shell, a Venturi tube, an electrode plate sleeve, an electrode plate and annular connecting shells. According to the device, an electrode plate and electrode plate sleeves which are attached to the surface of a Venturi tube are arranged according to the variable-diameter characteristic of the Venturi tube, meanwhile, a corresponding wire connecting structure is designed, and a shielding shell is designed according to the characteristic that electrical capacitance volume tomography needs shielding. The device has the advantages of being simple and stable in structure, easy to disassemble and assemble, capable of being disassembled and assembled many times and capable of being rapidly connected with other pipelines.

9 Claims, 5 Drawing Sheets

(56) References Cited

U.S. PATENT DOCUMENTS

| | | | |
|---|---|---|---|
| 10,788,347 B2 | 9/2020 | Byrd | |
| 2017/0241935 A1 | 8/2017 | Marashdeh et al. | |
| 2017/0328853 A1 | 11/2017 | Marashdeh et al. | |
| 2018/0021892 A1* | 1/2018 | Ye | B23K 35/26 219/146.22 |

FOREIGN PATENT DOCUMENTS

| | | |
|---|---|---|
| CN | 106092236 A | 11/2016 |
| CN | 106370705 A | 2/2017 |
| CN | 108152341 A | 6/2018 |
| CN | 111505066 A | 8/2020 |
| IN | 2695964 Y | 4/2005 |

OTHER PUBLICATIONS

CN First Office Action(202010357506.3); dated Dec. 3, 2020.
CN Notice Of Allowance(202010357506.3); dated Jan. 5, 2021.
Modified electrical capacitance tomography linear inversion algorithms for cryogenic fluids two-phase flow measurement; Date of Mailing: Dec. 31, 2019.
Permittivity-based liquid film sensor for cryogenic fluid; Date of Mailing: Oct. 31, 2016.
Preliminary evaluation of cryogenic two-phase flow imaging using electrical capacitance tomography; Date of Mailing: Jul. 20, 2017.
Capacitance-based liquid holdup measurement of cryogenic two-phase flow in a nearly-horizontal tube; Date of Mailing: Apr. 22, 2017.

* cited by examiner

ELECTRICAL CAPACITANCE VOLUME TOMOGRAPHY DEVICE FOR CRYOGENIC FLUID FLOWING IN VENTURI TUBE

CROSS-REFERENCE TO RELATED APPLICATIONS

The present application is a continuation of International Application No. PCT/CN2021/082080, filed on Mar. 22, 2021, which claims priority to Chinese Application No. 202010357506.3, filed on Apr. 29, 2020, the contents of both of which are incorporated herein by reference in their entireties.

TECHNICAL FIELD

The present disclosure relates to the field of cryogenic refrigeration engineering technology and sensor science and technology, in particular to an electrical capacitance volume tomography (ECVT) device for a cryogenic fluid flowing in a Venturi tube.

BACKGROUND

Two-phase flow in a tube is very common in industrial production. Measuring the distribution of two-phase flow in a tube is of great significance to study the heat transfer and flow mechanism of the two-phase flow. At the same time, obtaining the distribution of two-phase flow in the tube is also helpful to control and optimize industrial production. In a pipeline structure, variable-diameter pipelines such as Venturi tubes are common, and this kind of pipeline structure is complex and needs special attention. Electrical capacitance volume tomography (ECVT) technology is a non-invasive measurement technology, which uses the spatial difference of a dielectric constant caused by different phase distributions in the tube to figure out the spatial phase distribution of the fluid in the tube by measuring the capacitances between multiple plates. It has the advantages of fast response speed, no interference to the flow field and simultaneous acquisition of phase volume fraction and phase distribution data, and has been widely studied and applied in normal temperature fluid industry at present.

Compared with the two-phase flow in a tube at room temperature, the liquid-gas dielectric constant ratio of a cryogenic fluid is smaller by nearly one order of magnitude, usually within 1.5. Therefore, electrical capacitance volume tomography at a low temperature is very sensitive to external interference during measurement, while electrical capacitance volume tomography is more sensitive to noise than two-dimensional electrical capacitance tomography, so a good shielding device should be used in a sensor design. The changing diameter of the pipeline makes the installation of plates more difficult than the traditional electrical capacitance volume tomography sensor, so it is necessary to design a new structure. According to the present disclosure, invention and design are carried out in view of the phase distribution requirements of a cryogenic two-phase flow according to the requirements of a cryogenic fluid for shielding and the requirements of a variable-diameter pipeline for plate installation.

Zhang Xiaobin, Chen Jianye, Wang Yuchen, Xie Huangjun [1][2][3] et al. in the Institute of Refrigeration and Cryogenics have successively made theoretical and experimental research on the two-pole capacitance sensor for measuring the void fraction of a two-phase flow of a cryogenic fluid and the electrical capacitance volume tomography technology for measuring the phase distribution and void fraction of the cryogenic fluid. The experiment of Chen Jianye shows that the measurement error of the two-electrode capacitive sensor on the void fraction of a cryogenic fluid in the tube can be controlled within 15%, but the sensor is wrapped with two electrode plates and has no electromagnetic shielding structure, which is greatly different from the structure of the present disclosure. Xie Jun theoretically verified the electrical capacitance volume tomography technology for cryogenic fluid measurement, and found that the numerical experiment results were good, but the article did not involve the specific structure design of the electrical capacitance tomography sensor for the two-phase flow measurement of a cryogenic fluid.

Chinese patent CN108152341A discloses an electrical capacitance tomography device for a cryogenic fluid flowing in a pipe. The present disclosure sets a fastening stud to keep the electrode plate attached to the insulating pipe in view of the material shrinkage at a low temperature, and designs a shielding structure in view of the characteristics that the liquid dielectric constant and gas dielectric constant of the cryogenic fluid are close, which is quite different from the present disclosure in structure.

Chinese patent CN106370705A discloses an electrical capacitance volume tomography sensor. The diameter of the pipeline adopted by the present disclosure remains unchanged, and there is no wire path connected with the plate, which is quite different from the present disclosure in structure.

U.S. patent US2017/0328853A1 discloses an intelligent sensor for electrical capacitance volume tomography. In this application, the electrode plate is installed in a structure with a variable diameter along the radial direction, and the diameter along the axial direction is not variable, and there is no shielding structure, which is quite different from this application in structure.

To sum up, according to the characteristics of gas-liquid phase dielectric constant of a cryogenic fluid and the characteristics of a variable-diameter pipeline, it is necessary to design an electrical capacitance volume tomography device specifically for the flow of a cryogenic fluid in a variable-diameter pipeline. This technology has the characteristics of non-invasive measurement, and can obtain the distribution of phase content in a pipeline in three dimensions.

[1] CHEN J Y, WANG Y C, ZHANG W, et al. Capacitance-based liquid holdup measurement of cryogenic two-phase flow in a nearly-horizontal tube. Cryogenics 2017; 84:69-75.

[2] Wang Yuchen, Chen Jianye, Xu Lu, et al. Measurement method of the film thickness of cryogenic fluid in pipe based on capacitance method [J]. Journal of Zhejiang University: Engineering Edition, 2016, 50(10): 1855-1858.

[3] Xie H, Yu L, Zhou R, et al. Preliminary evaluation of cryogenic two-phase flow imaging using electrical capacitance tomography[J]. Cryogenics, 2017, 86.

SUMMARY

The present disclosure provides an electrical capacitance volume tomography (ECVT) device for the flow of a cryogenic fluid in a Venturi tube, which can reflect the phase distribution of two-phase flow of the cryogenic fluid in the Venturi tube in the form of images by measuring the capacitance between each pair of two independent electrode plates and processing the capacitance data accordingly. The device has the characteristics of non-invasiveness, simple and stable structure, simple disassembly and assembly, multiple disassembly and assembly, and quick connection with other pipelines. It can be used in a wide range from room temperature to profound hypothermia with a good electromagnetic shielding effect.

The technical solution of the present disclosure is as follows.

The present disclosure discloses an electrical capacitance volume tomography (ECVT) device for a cryogenic Venturi tube, which comprises the following components: a conductor rod, a metal shell, a Venturi tube, an electrode plate sleeve, an electrode plate and an annular connecting shell. The electrode plate is embedded in the electrode plate sleeve, the electrode plate sleeve wraps the Venturi tube, the annular connecting shell wraps the electrode plate sleeve, the metal shell wraps the annular connecting shell, and the conductor rod is inserted into the metal shell to contact with the metal hemisphere on the annular connecting shell.

Furthermore, a plurality of electrode plates is provided, which are curved surfaces with the outer surface area larger than the inner surface area, and are closely attached to the corresponding electrode plate grooves on the electrode plate sleeve. A wire slot is opened on the electrode plate sleeve near the upper part of the electrode plate groove and extends to the end of the electrode plate sleeve. The inner surface of the electrode plate sleeve embedded in the electrode plate completely coincides with the outer surface of the Venturi tube.

Furthermore, the electrode plate sleeve has the same axial length as the Venturi tube, and is provided with electrode plate grooves staggered along the axial direction. Connecting bosses and connecting grooves are distributed at both ends of the electrode plate sleeve, and the end of the connecting boss is provided with barbs. When two identical electrode plate sleeves are connected, the barb of the connecting boss is inserted into the connecting groove to be connected with and attached to the Venturi tube. The part of the electrode plate sleeve near the connecting boss is also provided with a boss for fixing the annular connecting shell.

Furthermore, the outer diameter of the annular connecting shell is the same as the maximum diameter of the two ends of the electrode plate sleeve. The two ends thereof have an inclination along the axial direction, which is the same as the inclination of the outer surface of the electrode plate sleeve. The annular connecting shell is provided with a positioning groove matched with a positioning boss on the electrode plate sleeve, two identical annular connecting shells surround the electrode plate sleeve, and the positioning groove is closely attached to the positioning boss on the electrode plate. A wire hole communicated with the wire slot at the end of the electrode plate sleeve is opened near the end of the annular connecting shell, and the wire hole is communicated with the wire slot on the outer surface of the annular connecting shell. The outer surface of the annular connecting shell is provided with metal conductor hemispheres, and the metal hemispheres are provided with screw holes, and can be fixed on the outer surface of the annular connecting shell by screws passing through the hemispheres. The metal hemispheres are connected with the wire slot.

Furthermore, the inside of the metal shell is provided with semi-cylindrical grooves corresponding to the number of the metal hemispheres on the annular connecting shell, and the radius of the cylinder is the same as that of the metal hemispheres. The inner diameter of the metal shell is equal to the outer diameter of the annular connecting shell, and the axial length is slightly longer than that of the Venturi tube. At the same time, the metal shell is provided with through holes with the same number and corresponding positions as the metal hemispheres on the annular connecting shell, and the diameter of the holes is slightly larger than the outer diameter of the metal hemispheres. The metal shell is sleeved into the annular connecting shell, the axis of the through hole is aligned with the spherical center of the metal hemisphere, and there is a certain gap between the metal hemisphere and the metal shell, and the two do not contact each other.

Furthermore, the number of the conductor rods is the same as that of the through holes on the metal shell, and the outer diameter is the same as that of the through holes. The inserted through holes are in contact with the metal hemispheres on the annular connecting shell, and the elastic metal sheet at the end of the conductor rods has certain elastic deformation when contacting with the metal hemispheres to ensure full contact with the metal hemispheres.

Compared with the prior art, the present disclosure adopts an integrated electrode plate sleeve, which is attached to a measuring pipeline, simplifies the fixed installation of a plurality of electrode plates on the variable-diameter pipeline into simple embedding work, overcomes the difficulty of installing the electrode plates on the variable-diameter pipeline, makes the installation of the electrode plates on the non-uniform pipeline simple and rapid, and keeps the relative position between the electrode plates and the pipeline unchanged in the measuring process. At the same time, the metal shell is used as the connecting and shielding device with other pipelines and matched with the corresponding circuit connection structure, which overcomes the difficulty that the traditional electrical capacitance tomography needs shielding interference devices and these shielding devices will introduce complex circuit structures, thus simplifying the circuit layout of electrical capacitance volume tomography and facilitating disassembly and assembly. In addition, the present disclosure adopts the line structure in which the wire slot is combined with the conductor rod, which overcomes the difficulty that the relative position between different lines interferes with the measured value due to the vibration change in the measurement process, and makes the measured result closer to the real value.

Reference signs: 1. Conductor rod; 2. Metal shell; 3. Venturi tube; 4. Electrode plate sleeve; 5. Electrode plate; 6. Annular connecting shell; 7. Connecting groove; 8. Electrode plate groove; 9. Connecting boss; 10. Positioning boss; 11. Positioning groove; 12. Wire hole; 13. Wire slot; 14. Metal hemisphere; 15. Metal conductor; 16. Insulating material; 17. Elastic metal sheet.

DESCRIPTION OF EMBODIMENTS

The present disclosure will be further explained below with reference to the attached drawings.

As shown in FIGS. 1-8, an electrical capacitance volume tomography device for a cryogenic fluid flowing in a Venturi tube includes a conductor rod 1, a metal shell 2, a Venturi tube 3, electrode plate sleeves 4, an electrode plate 5 and annular connecting shells 6.

Two electrode plate sleeves 4 are provided, which form a complete electrode plate device, and an inner surface of the electrode plate device is matched with an outer surface of the Venturi tube 3 and is fixed tightly attached to the outer surface of the Venturi tube 3; the electrode plate sleeve 4 is provided with a plurality of electrode plate grooves, the shape of which is matched with that of the electrode plate 5, and the electrode plate 5 is installed tightly attached to the plurality of electrode plate grooves of the electrode plate sleeve 4.

Two annular connecting shells 6 are provided, which form a complete connecting shell device; a peripheral circular diameter of two ends of the electrode plate device is equal to an outer diameter of the connecting shell device, and the two ends of the electrode plate device are fixedly connected with two ends of the connecting shell device respectively; the annular connecting shell 6 is provided with a plurality of metal hemispheres 14; the electrode plate 5 on the electrode plate sleeve 4 is welded with the plurality of metal hemisphere 14 through wires.

The metal shell 2 is provided with a plurality of semi-cylindrical grooves matched with the metal hemispheres 14, an inner diameter of the metal shell 2 is equal to an outer diameter of the connecting shell device, and the metal shell 2 sleeves the circumference of the connecting shell device and is fixed through the plurality of semi-cylindrical grooves; the metal shell 2 is provided with a round hole for installing the conductor rod 1.

Figure 1:
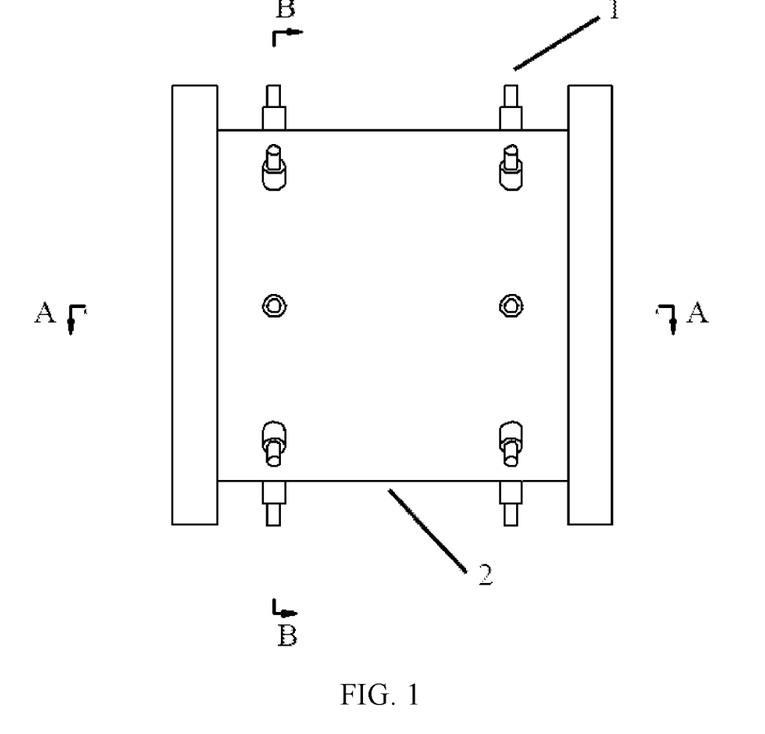
FIG. 1 is a front view of an electrical capacitance volume tomography (ECVT) device for a cryogenic fluid flowing in a Venturi tube according to the present disclosure.
Figure 2:
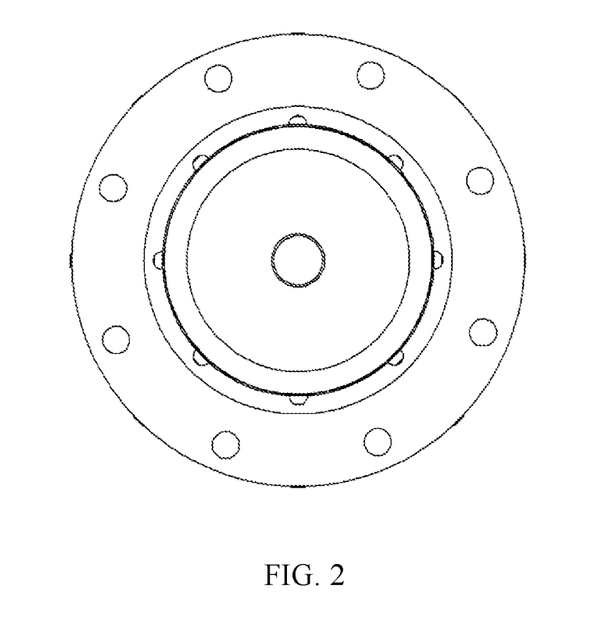
FIG. 2 is a left side view of an electrical capacitance volume tomography (ECVT) device for a cryogenic fluid flowing in a Venturi tube according to the present disclosure.
Figure 3:
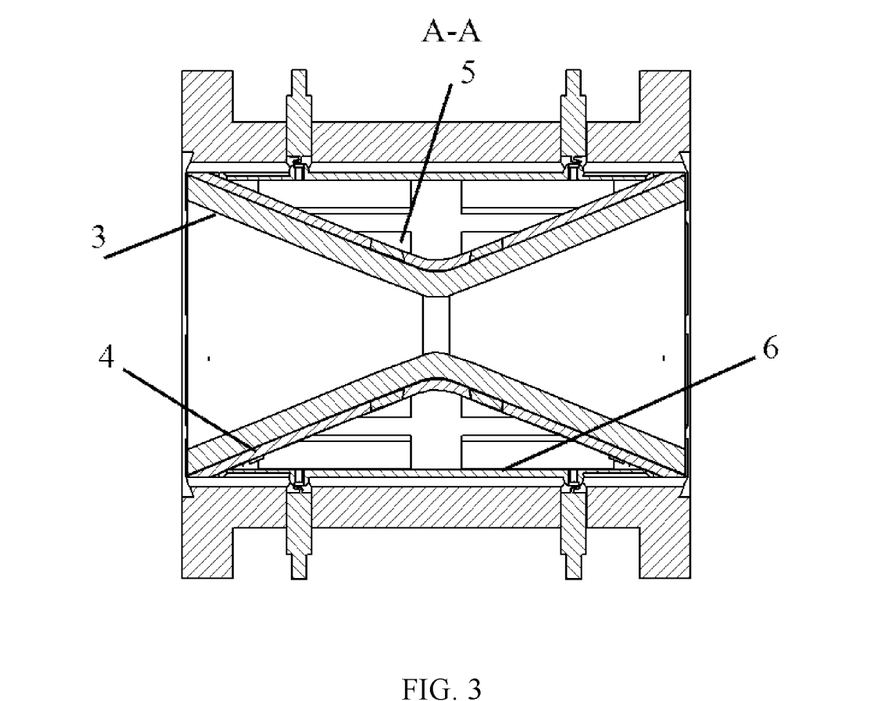
FIG. 3 is a sectional view of the A-A section of an electrical capacitance volume tomography (ECVT) device for a cryogenic fluid flowing in a Venturi tube according to the present disclosure.
Figure 4:
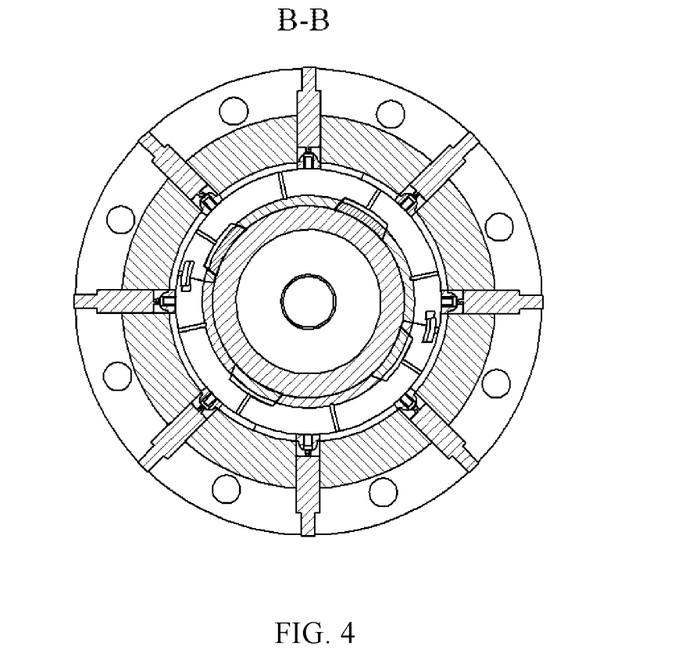
FIG. 4 is a sectional view of the B-B section of an electrical capacitance volume tomography (ECVT) device for a cryogenic fluid flowing in a Venturi tube according to the present disclosure.
Figure 9:
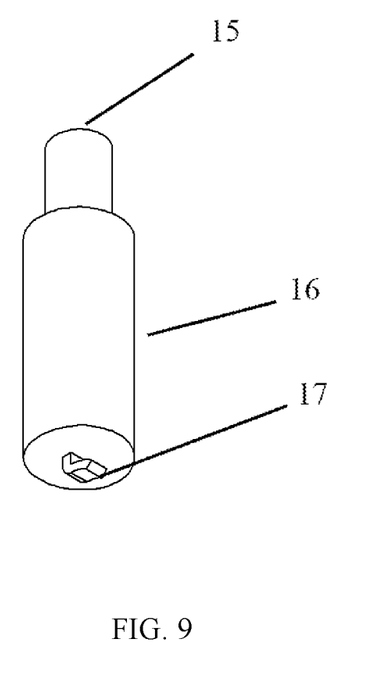
FIG. 9 is an axonometric view of a conductor rod of an electrical capacitance volume tomography (ECVT) device for a cryogenic fluid flowing in a Venturi tube according to the present disclosure.

The inside of the conductor rod 1 is a metal conductor 15, the periphery of the conductor rod 1 is wrapped with an insulating material 16, and the bottom of the conductor rod 1 is provided with an elastic metal sheet 17, and a maximum diameter of the conductor rod 1 is the same as that of the round hole on the metal shell 2 and larger than that of the semi-cylindrical groove on the metal shell 2; the conductor rod 1 is inserted into the round hole to make the elastic metal sheet 17 at the bottom contact with the metal hemisphere 14 on the annular connecting shell 6, and the conductor rod 1 and the round hole on the metal shell 2 are glued or welded; two ends of the metal shell 2 are connecting flanges with sealing grooves.

Figure 5:
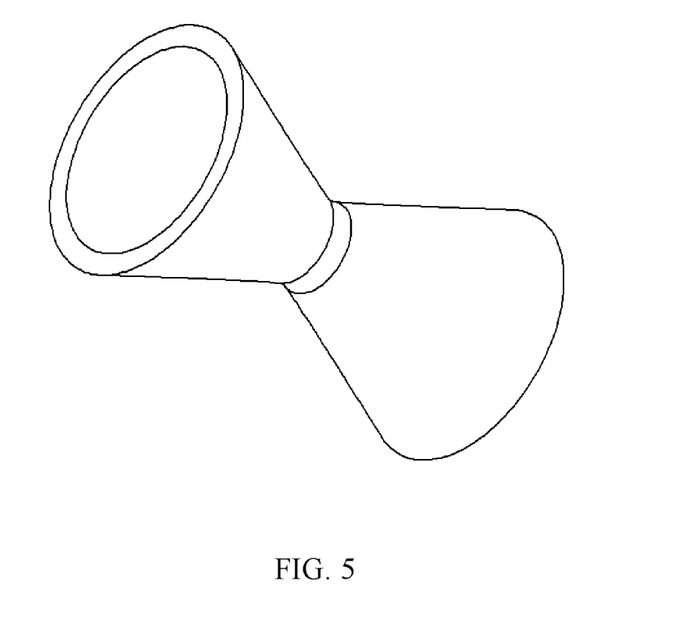
FIG. 5 is an axial view of a Venturi tube in an electrical capacitance volume tomography (ECVT) device for a cryogenic fluid flowing in a Venturi tube according to the present disclosure.
Figure 6:
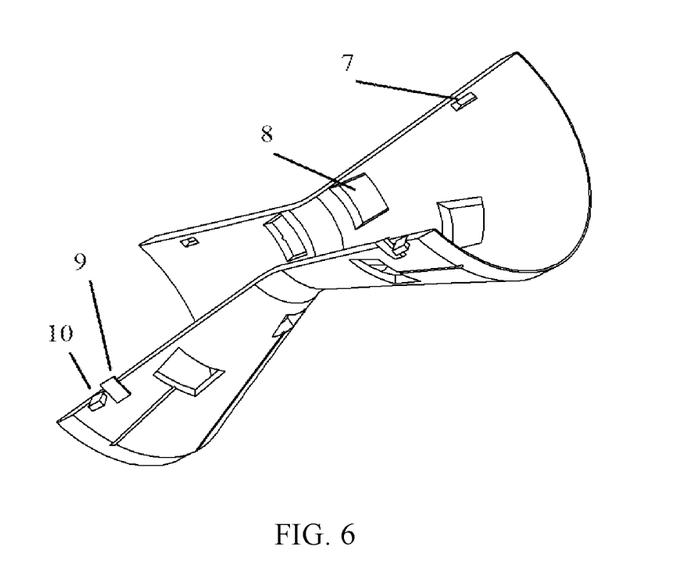
FIG. 6 is an axial view of an electrode pate sleeve of an electrical capacitance volume tomography (ECVT) device for a cryogenic fluid flowing in a Venturi tube according to the present disclosure.

In one embodiment of the present disclosure, the electrode plate device completely wraps the outer surface of Venturi 3; the two electrode plate sleeves 4 constituting the electrode plate device have the same structure; the two electrode plate sleeves 4 are matched and connected by connecting bosses 9 with barbs and connecting grooves 7 arranged at two ends of the electrode plate sleeves.

Figure 7:
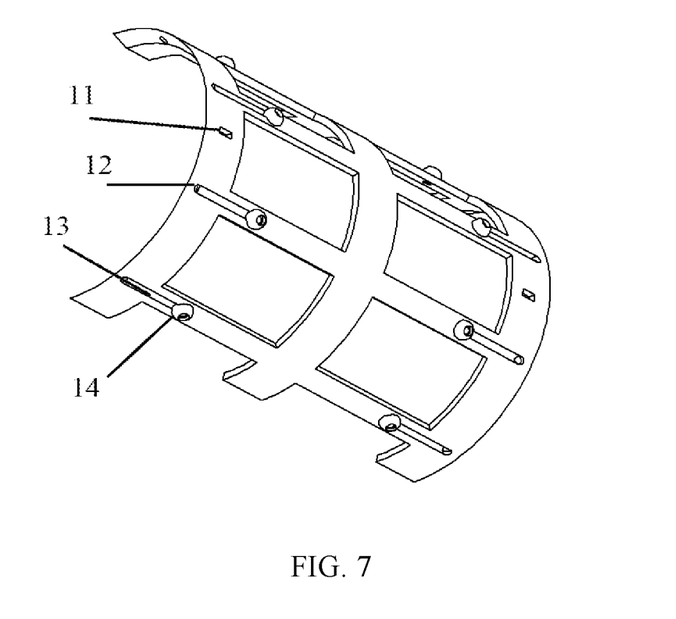
FIG. 7 is an axial view of an annular connecting shell of an electrical capacitance volume tomography (ECVT) device for a cryogenic fluid flowing in a Venturi tube of the present disclosure.

In one embodiment of the present disclosure, the connecting shell device is cylindrical; the metal hemispheres 14 thereon are evenly distributed in a circumferential direction, and a number of the metal hemispheres is equal to that of the electrode plates 5, and the metal hemispheres and the electrode plates 5 are connected in one-to-one correspondence; the two annular connecting shells 6 constituting the connecting shell device have the same shape; the connecting shell device is matched and fixed with a positioning boss 10 arranged on the electrode plate device through a positioning groove 11 arranged on the connecting shell device.

In one embodiment of the present disclosure, the shape of the electrode plate 5 is the same as that of the electrode plate groove of the electrode plate sleeve 4, and the electrode plate grooves are arranged in the following manner: the electrode plate grooves are arranged in multiple layers along an axial direction of the electrode plate sleeve 4; the number of the electrode plate grooves in each layer is the same, and the electrode plate grooves are evenly distributed along the circumferential direction; the electrode plate grooves in two adjacent layers are staggered, and an area of the outer surface of the electrode plate is larger than that of the inner surface; after being embedded in the electrode plate groove, the electrode plate sleeve 4 is attached and fixed with the Venturi tube 3.

In one embodiment of the present disclosure, the metal hemisphere 14 is fixed on the annular connecting shell 6 by screws.

In one embodiment of the present disclosure, the electrode pate sleeve 4 is provided with a wire slot for fixing a wire; the annular connecting shell 6 is provided with wire holes for the wire to pass through and a wire slot for the wire to be fixed; the wire holes on the annular connecting shell 6 are aligned with an end of the wire slot of the electrode plate sleeve 4; the wires passes through the wire slot on the electrode plate sleeve 4, then passes through the wire holes on the annular connecting shell 6 and is welded with the metal hemisphere 14 through the wire slot on the annular connecting shell 6.

Figure 8:
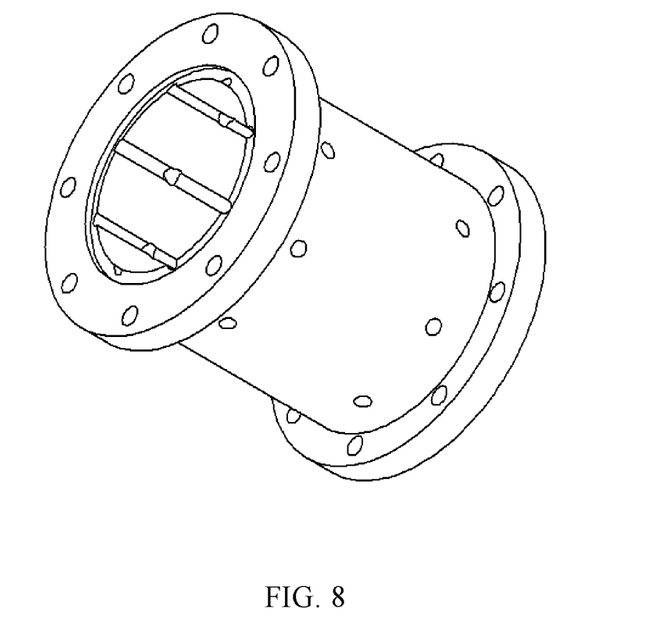
FIG. 8 is an axonometric view of a metal shell of an electrical capacitance volume tomography (ECVT) device for a cryogenic fluid flowing in a Venturi tube according to the present disclosure.

In one embodiment of the present disclosure, the radius of the metal hemisphere is the same as the radius of the semi-cylindrical groove on the inner surface of the metal shell 2, and the outer diameter of the annular connecting shell 6 is the same as the inner diameter of the metal shell 2.

In one embodiment of the present disclosure, the outer diameter of an insulating shell of the conductor rod 1 is the same as the diameter of the round hole on the metal shell 2 and larger than a diameter of the metal hemisphere on the annular connecting shell 6; the conductor rod 1 is inserted into the round hole and then closely attached to the round hole, and the elastic metal sheet 17 at the end of the conductor rod 1 is in contact with the metal hemisphere 14 on the annular connecting shell 6.

In one embodiment of the present disclosure, the material of the Venturi tube 3, the electrode pate sleeve 4 and the annular connecting shell 6 are insulating materials 16.

In one embodiment of the present disclosure, a structure of sixteen plates is adopted, and the electrode plates are divided into four layers, four in each layer. The Venturi tube, plate sleeve and annular connecting shell are made of phenolic resin, the electrode plate, the metal hemisphere on the annular connecting shell and the metal rod in the conductor rod are made of oxygen-free copper, and the insulating material around the conductor rod is made of phenolic resin. The electrode plate is embedded in the electrode plate sleeve, and after the electrode plate sleeve is attached to the Venturi tube and fixed, a wire with a metal shield is welded on each electrode plate. After the wire is fixed along the groove, each wire passes through the wire hole on the annular connecting shell. After the annular connecting shell is fixed on the electrode plate sleeve, the wire from the wire hole is fixed along the wire slot. The metal hemisphere is fixed by screws and then welded with the wire. The conductor rod is first fixed on the metal shell by cryogenic glue, and the whole metal shell is sleeved into the annular connecting shell and is positioned by elastic metal sheets symmetrically arranged at the end of the conductor rod. In actual work, cold gaseous working medium such as cold nitrogen and cold oxygen should be introduced first to complete the precooling of the device, so as to prevent embrittlement caused by quenching. During operation, firstly, one of the plates is excited by a voltage U, and the other plates are kept at zero potential. At this time, the capacitances between the excited plate and other plate pairs are measured separately, then the other plate is excited by the voltage U, and the capacitances between the excited plate and other plates at zero potential are measured, and so on. It should be noted that capacitance is measured non-repeatedly between the combinations of ever two plates. Recording capacitance to inverting into an image by the sensor is called as one operation from c. Therefore, for a 16-electrode ECT sensor, each operation can obtain 120 capacitance measurements for subsequent inversion imaging. The metal shell needs to be grounded.

The structure, technical solution and actual operation mode of the device of the present disclosure have been explained in detail with reference to the above specific embodiments. It should be understood that the above embodiments are only specific examples of the present disclosure and are not used to limit the present disclosure. Any modifications, equivalent substitutions, improvements and the like made within the spirit and principles of the present disclosure should be included in the scope of protection of the present disclosure.

What is claimed is:

1. An electrical capacitance volume tomography device for a cryogenic fluid flowing in a Venturi tube, comprising a conductor rod, a metal shell, a Venturi tube, electrode plate sleeves, an electrode plate and annular connecting shells;

wherein two electrode plate sleeves are provided, which form a complete electrode plate device, and an inner surface of the electrode plate device is matched with an outer surface of the Venturi tube and is fixed tightly attached to the outer surface of the Venturi tube; the electrode plate sleeve is provided with a plurality of electrode plate grooves, the shape of which the plurality of electrode plate grooves is matched with that of the electrode plate, and the electrode plate is installed tightly attached to the plurality of electrode plate grooves of the electrode plate sleeve;

two annular connecting shells are provided which form a complete connecting shell device; a peripheral circular diameter of two ends of the electrode plate device is equal to an outer diameter of the connecting shell device, and the two ends of the electrode plate device are fixedly connected with two ends of the connecting shell device, respectively; the annular connecting shells are provided with a plurality of metal hemispheres; the electrode plate on the electrode plate sleeve is welded with the plurality of metal hemisphere through wires;

the metal shell is provided with a plurality of semi-cylindrical grooves matched with the metal hemispheres, an inner diameter of the metal shell is equal to an outer diameter of the connecting shell device, and the metal shell sleeves the circumference of the connecting shell device and is fixed through the plurality of semi-cylindrical grooves; the metal shell is provided with a round hole for installing the conductor rod;

the inside of the conductor rod is a metal conductor, the periphery of the conductor rod is wrapped with an insulating material, and the bottom of the conductor rod is provided with an elastic metal sheet, and a maximum diameter of the conductor rod is the same as that of the round hole on the metal shell and larger than that of the semi-cylindrical groove on the metal shell; the conductor rod is inserted into the round hole to make the elastic metal sheet at the bottom contact with the metal hemisphere on the annular connecting shells, and the conductor rod and the round hole on the metal shell are glued or welded; two ends of the metal shell are connecting flanges with sealing grooves, wherein the electrode plate device completely wraps the outer surface of Venturi; the two electrode plate sleeves constituting the electrode plate device have the same structure; the two electrode plate sleeves are matched and connected by connecting bosses with barbs and connecting grooves arranged at two ends of the electrode plate sleeves.

2. The electrical capacitance volume tomography device for a cryogenic fluid flowing in a Venturi tube according to claim 1, wherein the connecting shell device is cylindrical; the metal hemispheres thereon are evenly distributed in a circumferential direction, and a number of the metal hemispheres is equal to that of the electrode plates, and the metal hemispheres and the electrode plates are connected in one-to-one correspondence; the two annular connecting shells constituting the connecting shell device have the same shape; the connecting shell device is matched and fixed with a positioning boss arranged on the electrode plate device through a positioning groove arranged on the connecting shell device.

3. The electrical capacitance volume tomography device for a cryogenic fluid flowing in a Venturi tube according to claim 1, wherein the shape of the electrode plate is the same as that of the electrode plate groove of the electrode plate sleeve, and the electrode plate grooves are arranged in multiple layers along an axial direction of the electrode plate sleeve; the number of the electrode plate grooves in each layer is the same, and the electrode plate grooves are evenly distributed along the circumferential direction; the electrode plate grooves in two adjacent layers are staggered, and an area of the outer surface of the electrode plate is larger than that of the inner surface; after being embedded in the electrode plate groove, the electrode plate sleeve is attached and fixed with the Venturi tube.

4. The electrical capacitance volume tomography device for a cryogenic fluid flowing in a Venturi tube according to claim 1, wherein the metal hemisphere is fixed on the annular connecting shell by screws.

5. The electrical capacitance volume tomography device for a cryogenic fluid flowing in a Venturi tube according to claim 1, wherein the electrode pate sleeve is provided with a wire slot for fixing a wire; the annular connecting shell is provided with wire holes for the wire to pass through and a wire slot for the wire to be fixed; the wire holes on the annular connecting shell are aligned with an end of the wire slot of the electrode plate sleeve; the wires passes through the wire slot on the electrode plate sleeve, then passes through the wire holes on the annular connecting shell and is welded with the metal hemisphere through the wire slot on the annular connecting shell.

6. The electrical capacitance volume tomography device for a cryogenic fluid flowing in a Venturi tube according to claim 1, wherein a radius of the metal hemisphere is the same as a radius of the semi-cylindrical groove on the inner surface of the metal shell, and an outer diameter of the annular connecting shell is the same as an inner diameter of the metal shell.

7. The electrical capacitance volume tomography device for a cryogenic fluid flowing in a Venturi tube according to claim 1, wherein an outer diameter of an insulating shell of the conductor rod is the same as a diameter of the round hole on the metal shell and larger than a diameter of the metal hemisphere on the annular connecting shell; the conductor rod is inserted into the round hole and then closely attached to the round hole, and the elastic metal sheet at the end of the conductor rod is in contact with the metal hemisphere on the annular connecting shell.

8. The electrical capacitance volume tomography device for a cryogenic fluid flowing in a Venturi tube according to claim 1, wherein the material of the Venturi tube, the electrode pate sleeve and the annular connecting shell are insulating materials.

9. A capacitance measurement method for an electrical capacitance volume tomography device for a cryogenic fluid flowing in a Venturi tube according to claim 1, comprising:
keeping the metal shell grounded, and introducing a pre-cooled gaseous working medium to precool the device to prevent brittle fracture caused by quenching;
during operation, firstly, using a voltage U to excite one of the electrode plates, keeping the other electrode plates at zero potential, and measuring a capacitance between the excited electrode plate and other electrode plate pairs, respectively, then using the voltage U to excite another electrode plate, measuring the capacitance between the exited electrode plate and other electrode plates at zero potential, and so on, until the capacitance measurement between all electrode plates is completed, wherein the capacitance between the combinations of every two electrode plates is measured non-repeatedly, and the recorded capacitances are used for subsequent inversion imaging.

\* \* \* \* \*